United States Patent

Wolf et al.

[11] Patent Number: 5,213,544
[45] Date of Patent: May 25, 1993

[54] COMPLIANT, ACOUSTICALLY INSULATING TORSIONALLY ELASTIC COUPLING

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 572,981

[22] PCT Filed: Dec. 20, 1989

[86] PCT No.: PCT/EP89/01578

§ 371 Date: Aug. 22, 1990

§ 102(e) Date: Aug. 22, 1990

[87] PCT Pub. No.: WO90/07068

PCT Pub. Date: Jun. 28, 1990

[30] Foreign Application Priority Data

Dec. 22, 1988 [DE] Fed. Rep. of Germany ....... 3843320

[51] Int. Cl.⁵ .............................. F16D 3/68
[52] U.S. Cl. ...................... 464/85; 464/87; 464/89
[58] Field of Search ............ 464/85, 83, 87, 89, 464/91, 92, 93, 94, 95, 96; 192/106.1

[56] References Cited

U.S. PATENT DOCUMENTS

| | | | |
|---|---|---|---|
| 3,232,077 | 2/1966 | Binder | 464/91 |
| 3,245,229 | 4/1966 | Fädler | 464/91 X |
| 4,483,685 | 11/1984 | Spasiano et al. | 464/83 |
| 4,750,720 | 6/1988 | Wolf et al. | 267/219 |
| 4,776,573 | 10/1988 | Wolf et al. | 267/104.1 |
| 4,795,402 | 1/1989 | Reichardt | 464/83 X |
| 4,807,857 | 2/1989 | Wolf et al. | 267/140.3 |
| 4,861,003 | 8/1989 | Wolf et al. | 267/140.1 |
| 4,895,355 | 1/1990 | Wolf et al. | 267/257 |
| 4,925,163 | 5/1990 | Wolf et al. | 267/153 |

FOREIGN PATENT DOCUMENTS

| | | |
|---|---|---|
| 317732 | 5/1989 | European Pat. Off. |
| 2421663 | 11/1975 | Fed. Rep. of Germany |
| 8535344 | 4/1986 | Fed. Rep. of Germany |
| 1495611 | 9/1967 | France |
| 2541403 | 8/1984 | France |
| 473596 | 10/1937 | United Kingdom |
| 994075 | 6/1965 | United Kingdom |

Primary Examiner—Daniel P. Stodola
Assistant Examiner—William G. Battista, Jr.
Attorney, Agent, or Firm—Lowe, Price, LeBlanc & Becker

[57] ABSTRACT

A compliant, acoustically insulating, torsionally elastic shaft coupling includes a shaft part and a driver part formed by support plates. At least one cage is defined by the support plates which house at least one rubber element of corresponding shape. To achieve an especially compliant torsionally spring characteristic line, the rubber element is formed with uniformly spaced cavities having a cross-section larger than that of hollow ducts centrally crossing a series of these cavities and extending at least essentially over the entire height of the rubber element.

10 Claims, 2 Drawing Sheets

COMPLIANT, ACOUSTICALLY INSULATING TORSIONALLY ELASTIC COUPLING

TECHNICAL FIELD

The invention relates to a torsionally elastic shaft coupling.

BACKGROUND ART

Known couplings of this kind comprise stop elements engaging one another from behind in the direction of rotation of two coupling parts, with a rubber buffer being inserted between the elements to achieve torsional elasticity. These rubber buffers are blocks of full-rubber of comparatively small size compared to the couplings, whereby they are at least substantially and possibly totally stressed by pressure or tension by the mutually rotatable stops of the coupling parts.

The operational range of these couplings is characterized by only a very small angle of rotation. Moreover, such couplings are generally very noisy, that is, they transmit acoustic waves at the linkage which are practically unattenuated from one shaft to the other shaft which are connected together.

SUMMARY OF THE INVENTION

The object of the invention is to provide a torsionally elastic shaft coupling having large angles of rotation and compliant characteristics, while simulataneously acoustically de-coupling the input and output shafts.

Accordingly the essence of the invention rests on using comparatively bulky rubber elements instead of compact rubber buffers in order to achieve torsional elasticity, said bulky elements being inserted in cages or chambers formed in the support plates of the coupling. By making the chamber oversized, the required escape space is provided for the rubber elements. These steps result in high uniformity of the deformation stresses in the rubber elements, whereby on one hand a significant enlargement is achieved in the useful angle of rotation of such a torsionally elastic coupling, and on the other hand a service life hitherto not available with torsionally elastic couplings based on rubber elements is achieved.

The torsionally elastic properties of this coupling may be significantly improved when the rubber element comprises equally spaced cavities assuming the shape of polyhedra or spheres and of which the cross-sections are larger than the cross-sections of hollow ducts passing centrally through a series of these cavities and extending at least essentially axially over at least substantially the total height of the rubber elements. Preferably the cavities are arrayed in the manner of a cubic, inner-centered ball packing of highest density, where the distribution density decreases from the radial inside to the radial outside and preferably in at least four, preferably at least five superposed layers arranged axially in relation to the coupling or the rubber elements.

Such hollow structure of the rubber element provides both improved, compliant and wide operational ranges of the characteristic spring line on the one hand, and on the other hand and even more importantly, also improved acoustic de-coupling between the input and the output shafts.

The torsionally elastic shaft coupling of the invention may be designed both as a permanent coupling and as a detachable coupling, further as a conventional detachable coupling with a friction lining.

In the drive train of motor vehicles, the coupling preferably shall be used both as a clutch between the engine and the transmission and as a permanent coupling in the drive shaft.

BEST MODE FOR CARRYING OUT THE INVENTION

Figure 1:
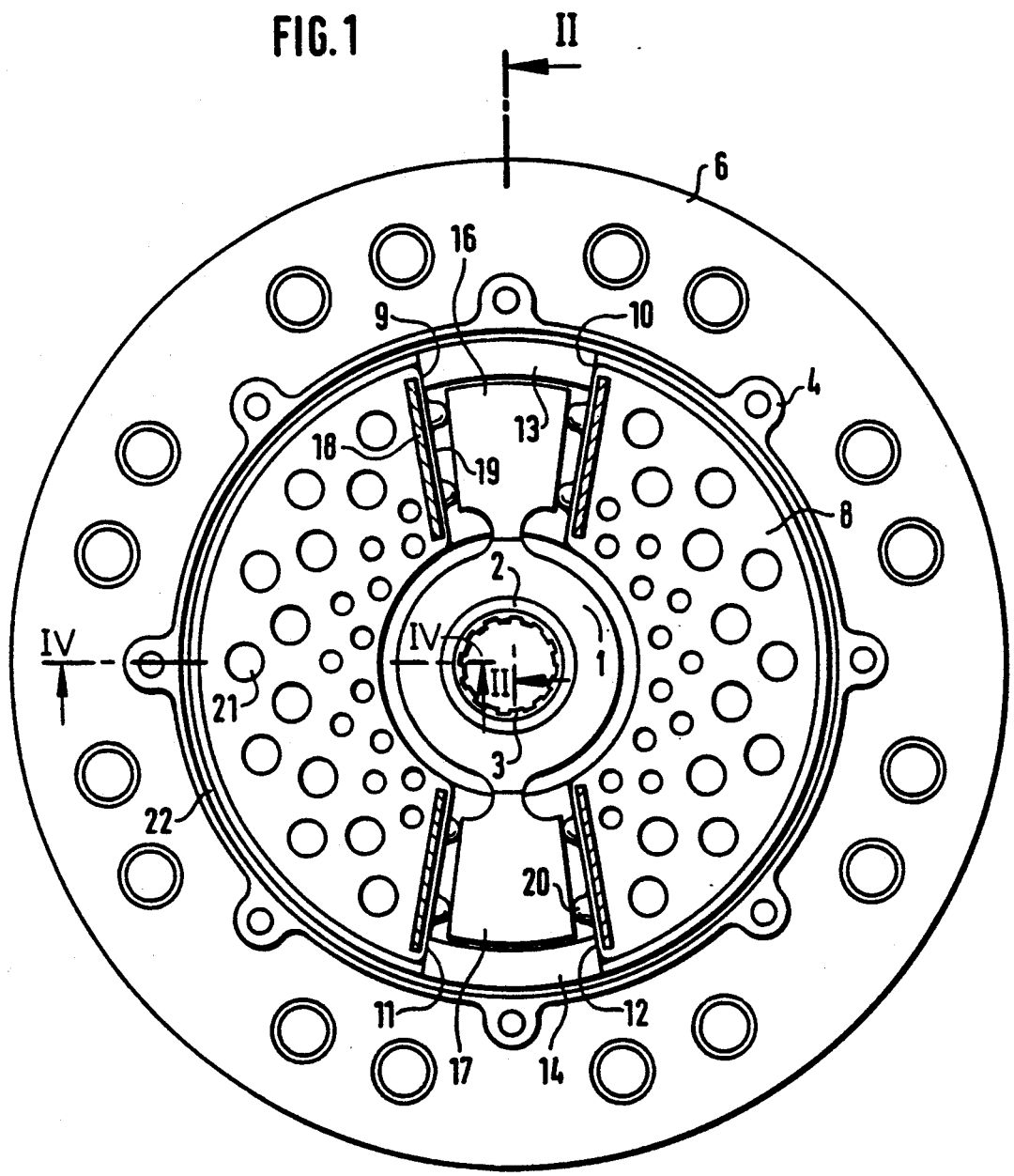
FIG. 1 is an axial topview of an opened and partly sectioned shaft coupling.

The torsionally elastic shaft-coupling shown in FIG. 1 consists of two coupling parts, namely the hub part 1 which is connected to a first of two shafts (not shown) to be linked, co-rotational to this shaft, and a drive part 4, which is co-rotationally connected to the other shaft.

Figure 2:
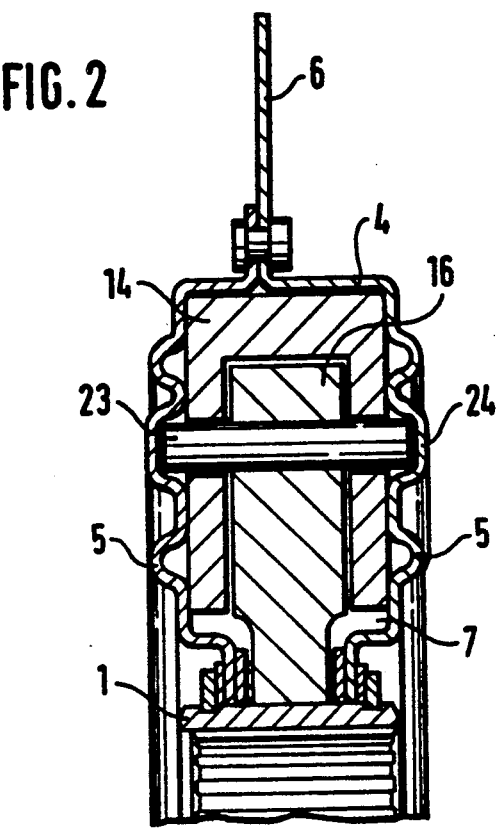
FIG. 2 is a section along II—II of FIG. 1.
Figure 3:
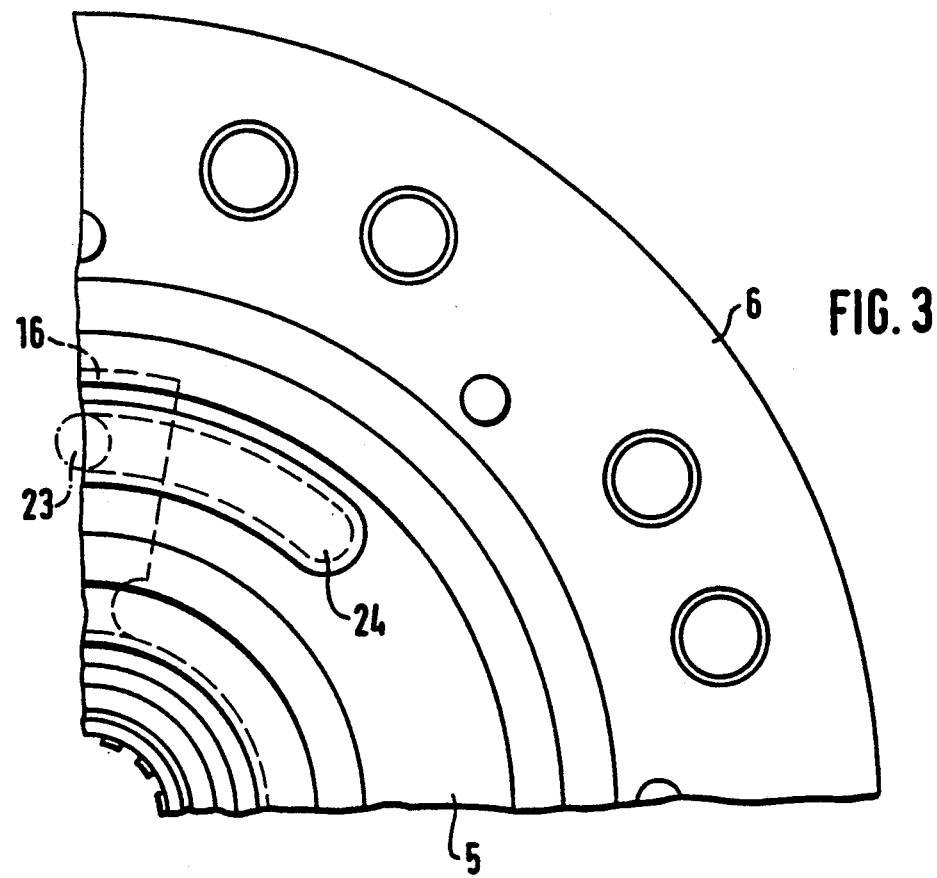
FIG. 3 is a view in the direction III of FIG. 2.

A groove-spring collar 3 serves in known manner to connect the hub part 1 to one of the shaft. Slide bearing elements 2 secure the support plates 5 (FIG. 2) to the hub part 1.

In the embodiment of a detachable coupling shown here, a lining support 6 serves to connect the drive part 4 to the second of the two shafts to be linked.

A box-shaped caged area 7 of cylindrical form when seen axially is defined by the two support plates 5. This support-plate caged area 7 houses two identical rubber elements 8 resting against the stop surfaces 9,10,11,12 formed on hub-like, radial stops 13,14 which in turn are irrotationally connected to the drive part 4 or are integral with it. The stops 14 comprise clearances 15 in the radial plane, with drive arms 16, 17 also extending radially and in spoke-like manner being rotatable through said clearances 15, said drive arms being irrotational components of the hub part 1.

The axial stop surfaces 19 reinforced with steel plates 18 comprise circumferentially projecting bosses 20 whereby the rubber elements 8 loosely rest against the stop surfaces of the drivers 16, 17.

Figure 4:
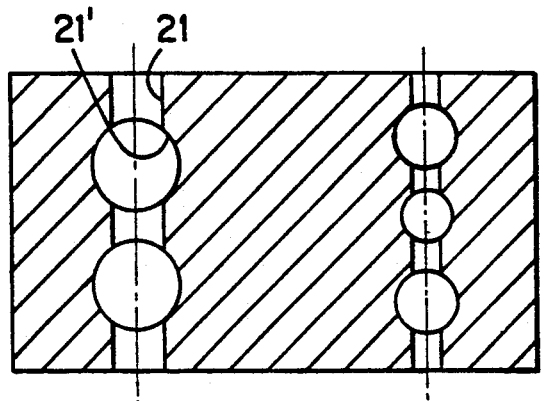
FIG. 4 is a sectional view taken along the line IV—IV of FIG. 1.

The rubber element 8 consists of a rubber block crossed by a number of hollow ducts 21 passing through the entire axial height of the said element and through spherical cavities 21' in said block and of a diameter larger than that of the hollow ducts 21. These cavities 21' are shown in FIG. 4.

The inside surfaces of the support-plates caged 5 defining area 7 and the outside surfaces of the rubber element 8 are teflonized to reduce the friction between the cage walls and the surfaces of the rubber elements.

The contours of the cage walls are oversized to such an extent in the radial and/or axial direction relative to the outer contours of the rubber elements that these shall be resting in the cages while leaving some play in the form of an annular gap 22 in said cages. As a result and especially in the initial zone of operation of the spring characteristic line of this rubber element, an especially compliant characteristic may be achieved.

It being desirable in many applications not to stress the rubber elements providing the torsional elasticity of the coupling all the way to the load limit, an axially projecting stop boss 23 is present at the driver 16 of the hub part 1 and engages a groove or clearance 24 limiting the angle of rotation and present at at least one of the support plates 5, in this instance being machined by deep-drawing.

We claim:

1. A torsionally elastic shaftcoupling, comprising a pair of coupling parts including a hub part connectible to one of two shafts to be linked, and a driven part including a pair of support plates having means for connection to the second of the said two shafts to be linked, said support plates defining a caged area therebetween, at least one rubber element in the shape of a ring segment disposed within said caged area for torsionally connecting the hub part to the support plates, said rubber element comprising essentially parallel hollow ducts, essentially each and every one of said ducts extending in the same direction and parallel to the main axis of said hub part, wherein the rubber element includes spaced cavities intersected by the hollow ducts, said cavities having cross-sections which are larger than that of the hollow ducts passing through them.

2. Coupling defined in claim 1, wherein the hub part includes at least one driver extending radially, in a spoke-like manner, between the support plates to be engagable with at least one load-absorbing surface of said at least one rubber element, said driver including a stop which may cooperate with a second stop surface of the rubber element.

3. Coupling defined in claim 2, wherein the stop of the drive part is so cut-out in the radial plane that the hub-part driver can be rotated through the stop of the driver part while the stop surfaces of the rubber element remain supported.

4. Coupling defined in claim 3, wherein the stop surfaces of the rubber element are reinforced by load-absorbing reinforcing parts.

5. Coupling defined in claim 1, wherein the inside surfaces of the support plates defining said caged area and the outside surfaces of the rubber element are complementary to each other.

6. Coupling defined in claim 1, wherein cylindrical boundary surfaces of the rubber element and of the cage are mutually opposite each other with a clearance therebetween.

7. Coupling defined in claim 1, further comprising means for reducing friction between the rubber element and abutting wall surfaces of the support plates.

8. Coupling defined in claim 1 wherein the hub part includes a driver having an axially projecting, pin-shaped stop element engaging an arcuate groove in at least one of the two support plates.

9. Coupling defined in claim 8 wherein in an action zone of the hub-part driver, surfaces of the rubber element extending adjacent the driver include easily deforming ribs or bosses projecting in the circumferential direction.

10. Coupling defined in claim 1, wherein said spaced cavities are uniformly spaced cavities.

* * * * *